United States Patent
Sowers et al.

(10) Patent No.: US 8,997,694 B2
(45) Date of Patent: Apr. 7, 2015

(54) MICROBIAL MEDIATED CHEMICAL SEQUESTERING OF PHOSPHATE IN A CLOSED-LOOP RECIRCULATING AQUACULTURE SYSTEM

(75) Inventors: Kevin R. Sowers, Baltimore, MD (US); Keiko Saito, Baltimore, MD (US); Harold J. Schreier, Baltimore, MD (US)

(73) Assignee: University of Maryland Baltimore County, Baltimore, MD (US)

(*) Notice: Subject to any disclaimer, the term of this patent is extended or adjusted under 35 U.S.C. 154(b) by 441 days.

(21) Appl. No.: 13/381,976

(22) PCT Filed: Jul. 2, 2010

(86) PCT No.: PCT/US2010/040965
§ 371 (c)(1),
(2), (4) Date: Feb. 21, 2012

(87) PCT Pub. No.: WO2011/003097
PCT Pub. Date: Jan. 6, 2011

(65) Prior Publication Data
US 2012/0152176 A1 Jun. 21, 2012

Related U.S. Application Data

(60) Provisional application No. 61/222,986, filed on Jul. 3, 2009.

(51) Int. Cl.
*A01K 63/04* (2006.01)
*C02F 3/30* (2006.01)
(Continued)

(52) U.S. Cl.
CPC ............... *C02F 3/305* (2013.01); *A01K 63/04* (2013.01); *C02F 1/5263* (2013.01); *C02F 1/66* (2013.01);
(Continued)

(58) Field of Classification Search
CPC ............... C02F 3/28; C02F 3/32; C02F 3/30; C02F 3/10; C02F 9/00; A01K 63/04
USPC ............... 119/200, 215, 217, 226, 231, 268; 210/610, 600, 601, 602, 605, 606, 169, 210/167.01, 195.1, 906, 907
See application file for complete search history.

(56) References Cited

U.S. PATENT DOCUMENTS 3,456,796 A * 7/1969 Eck et al. ............ 210/728
5,271,848 A * 12/1993 Smith et al. ............ 210/702
(Continued)

FOREIGN PATENT DOCUMENTS

JP 7-108294 A 4/1995
JP 2007-508813 A 4/2007
(Continued)

OTHER PUBLICATIONS

Arvin, E., "Observations Supporting Phosphate Removal by Biologically Mediated Chemical Precipitation—A Review", "Water Sci. Tech.", 1983, pp. 43-63, vol. 15.
(Continued)

*Primary Examiner* — Rob Swiatek
*Assistant Examiner* — Ebony Evans
(74) *Attorney, Agent, or Firm* — Hultquist, PLLC; Mary B. Grant

(57) ABSTRACT

A system and method for removal of phosphates from a closed loop estuarine or marine recirculating aquaculture system (RAS), involving denitrification in the presence of a media substrate for: 1) anaerobic nitrate, nitrite and ammonia removal and 2) sequestering of excess phosphate in the RAS. Phosphate is precipitated in or on the denitrifying biofilm formed on the media substrate as phosphate salts. The phosphate salt-containing media substrate can be removed from the RAS, the phosphates can be removed, and both the substrate and the phosphates can be reused or recycled.

20 Claims, 2 Drawing Sheets

(51) Int. Cl.
- *C02F 1/52* (2006.01)
- *C02F 1/66* (2006.01)
- *C02F 3/28* (2006.01)
- *C02F 3/06* (2006.01)
- *C02F 3/10* (2006.01)
- *C02F 101/10* (2006.01)
- *C02F 103/08* (2006.01)
- *C02F 103/20* (2006.01)

(52) U.S. Cl.
CPC ............. *C02F 3/2806* (2013.01); *C02F 3/06* (2013.01); *C02F 3/109* (2013.01); *C02F 2101/105* (2013.01); *C02F 2103/08* (2013.01); *C02F 2103/20* (2013.01); *Y02E 50/343* (2013.01)

(56) References Cited

U.S. PATENT DOCUMENTS

| | | | | |
|---|---|---|---|---|
| 5,433,843 | A * | 7/1995 | Calabrese | 210/138 |
| 7,314,741 | B2 * | 1/2008 | Tal et al. | 435/170 |
| 2002/0158009 | A1 * | 10/2002 | Khudenko | 210/605 |
| 2004/0229343 | A1 * | 11/2004 | Husain et al. | 435/262 |
| 2004/0244715 | A1 | 12/2004 | Schreier et al. | |
| 2005/0061737 | A1 | 3/2005 | Linden et al. | |
| 2008/0006576 | A1 | 1/2008 | Suzuki et al. | |
| 2010/0012581 | A1 * | 1/2010 | Singer et al. | 210/610 |
| 2011/0247985 | A1 * | 10/2011 | Theodore | 210/720 |

FOREIGN PATENT DOCUMENTS

| | | |
|---|---|---|
| KR | 10-0254136 B1 | 4/2000 |
| WO | 03065798 A1 | 8/2003 |
| WO | 2005033019 A1 | 4/2005 |
| WO | 2008131403 A1 | 10/2008 |

OTHER PUBLICATIONS

Arvin, E., et al., "Phophate Precipitation in Biofilms and Flocs", "Water Sci. Tech.", 1983, pp. 65-85, vol. 15.

Asano, T., et al., "Water Reuse: Issues, Technologies, and Applications", 2007, pp. 324-326, Publisher: McGraw Hill.

Tal, Y., et al., "Environmentally sustainable land-based marine aquaculture", "Aquaculture", Jan. 7, 2009, pp. 28-35, vol. 286.

Note: For the non-patent literature citations that no month of publication is indicated, the year of publication is more than 1 year prior to the effective filing date of the present application.

* cited by examiner

MICROBIAL MEDIATED CHEMICAL SEQUESTERING OF PHOSPHATE IN A CLOSED-LOOP RECIRCULATING AQUACULTURE SYSTEM

CROSS-REFERENCE TO RELATED APPLICATIONS

This application is a U.S. national phase under the provisions of 35 U.S.C. §371 of International Patent Application No. PCT/US2010/040965 filed Jul. 2, 2010, which in turn claims the benefit of priority of U.S. Provisional Patent Application No. 61/222,986, filed on Jul. 3, 2009 in the names of Kevin R. Sowers, Keiko Saito, and Harold J. Schreier for "MICROBIAL MEDIATED CHEMICAL SEQUESTERING OF PHOSPHATE IN A CLOSED-LOOP RECIRCULATING AQUACULTURE SYSTEM." The disclosures of such International Patent Application No. PCT/US2010/040965 and U.S. Provisional Patent Application No. 61/222,986 are hereby incorporated herein by reference in their respective entireties, for all purposes.

GOVERNMENT RIGHTS IN THE INVENTION

This invention was made with government support under a grant awarded by the Binational Agricultural Research and Development Fund (BARD). The government has certain rights in the invention.

FIELD OF THE INVENTION

The present invention relates to removing contaminants from an aquaculture system, and more particularly, from a closed estuarine/marine recirculating aquaculture system (RAS), and methods for using the same for promoting phosphate removal through use of a dual use media substrate, effective both in denitrification of the RAS and for sequestering excess phosphate in the system.

DESCRIPTION OF THE RELATED ART

The development of technology that enables the aquaculture industry to expand production of an aquatic species in urban recirculating systems requires systematic examination of each aspect of said aquatic systems. Optimal growth of the aquatic species is directly related to the environmental parameters, and as such, pollutants and waste by-products must be removed from the system to assure the species viability.

Anaerobic denitrification is a critical process for preventing accumulation of nitrogen products to toxic levels in a closed-loop RAS. Similarly, reduction of phosphates to prevent accumulation to toxic levels is also essential in the RAS.

The primary source of phosphate in a closed loop RAS is fish feed which has an average composition of 1.0-1.5% phosphate by weight. Phosphate enters the system as both uneaten food and fish waste. In open net pens, and in flow-through and semi-closed aquaculture systems, the phosphate is diluted by continual or periodic replenishment of brackish water or seawater in the system, with the wastewater potentially impacting the immediate environment.

A unique feature of the closed-loop RAS is the complete recycling of water by biological processing of the waste products, which minimizes the environmental impact of the RAS. The primary nitrogen waste product, ammonia, is biologically oxidized to less toxic nitrate in aerobic nitrifying bioreactors, subsequently reduced to nitrite and finally converted to nitrogen gas in an anaerobic denitrifying bioreactor. The nitrogen is released into the atmosphere. Solid waste is separated and converted to methane gas in an anaerobic bioreactor, which is then burned as an energy source for the system, yielding water and carbon dioxide. Soluble phosphate will continue to accumulate to toxic levels unless continually removed from the system.

In wastewater treatments plants, phosphate removal is achieved largely by chemical precipitation with calcium hydroxide, alum or hydrated aluminum sulfate or ferric salts, which are expensive and cause an increase of sludge volume by up to 40%.

Phosphate can also be removed biologically by accumulation in microbial biomass in activated sludge. Although some phosphate will be transferred to the sludge, the soluble portions of this sludge material are recirculated through the system. In a RAS, this includes the denitrifying and methanogenic bioreactors, and phosphate will accumulate in the overall system including the fish tanks, where it can reach toxic levels.

Biological phosphate removal is also used in wastewater treatment by a process known as enhanced biological phosphate removal. The principal advantages of biological phosphorous removal are reduced chemical costs and less sludge production as compared to chemical precipitation. In an anaerobic waste treatment bioreactor, phosphates are sequestered by assimilation by phosphate accumulating microorganisms as stored polyphosphates, but some are subsequently released as orthophosphates during the fermentation process. In an aerobic bioreactor, bacteria have a greater storage capacity for polyphosphates, and the sequestered phosphate is ultimately removed with disposal of solid waste sludge from the system. The biological process has a lower overall operating cost, using sequential anaerobic and aerobic waste treatments, when compared with chemical precipitation. However, the biological process may not be as reliable, and cannot achieve the same high levels of phosphorus removal as a well-run physical-chemical process.

Accordingly, it would be advantageous to develop a system and method effective to remove phosphate from a RAS, as an alternative to exclusively using expensive chemical or less efficient biological approaches currently known. Such a system and methods would provide reduction or removal of the phosphates in a RAS in a reliable, less expensive, effective and efficient manner.

SUMMARY OF THE INVENTION

The present invention relates to methods and systems for removal of phosphates from a closed estuarine or marine recirculating aquaculture system (RAS).

In one aspect the invention provides a method for at least partially reducing phosphate products in a closed estuarine or marine recirculating aquaculture system comprising brackish or salt water, the method comprising: denitrifying the brackish or salt water of the aquaculture system, in the presence of a media substrate, under conditions sufficient to form a denitrifying biofilm on the media substrate and sufficient to form phosphate salts on or in the denitrifying biofilm; and removing the media substrate bearing the biofilm and phosphate salts from the aquaculture system.

In another aspect the invention provides a closed estuarine or marine recirculating aquaculture system comprising the elements of brackish or salt water comprising nitrate products and phosphate products; a rearing tank comprising an aquatic species; and a denitrification unit comprising a media substrate, wherein the denitrification unit is effective to denitrify the brackish salt water and effective to form a denitrifying biofilm on the media substrate and effective to form phosphate salts on or in the denitrifying biofilm.

In still another aspect the invention provides a method of anaerobic treatment of waste material of an aquacultured species in a closed estuarine or marine recirculating aquaculture system comprising brackish or salt water, the method comprising: denitrifying the brackish or salt water of the aquaculture system, in the presence of a media substrate, under conditions sufficient to form a denitrifying biofilm on the media substrate and sufficient to form phosphate salts on or in the denitrifying biofilm to thereby sequester phosphate; removing the media substrate from the aquaculture system; and removing waste material from the aquaculture system and anaerobically digesting the same to produce methane gas.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
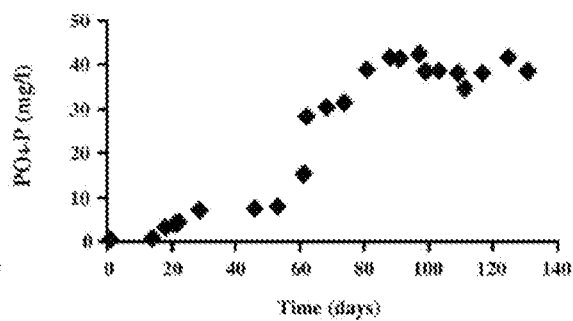
FIG. 1 is a graph, illustrating the levels of soluble phosphate in system water in a closed loop RAS with anaerobic denitrifying bioreactor, as described in Example 1.

The present invention provides a method for extracellular removal of phosphate from a closed estuarine or marine recirculating aquaculture system (RAS), by a combination of chemical and biological processes. The invention provides an efficient and cost effective method that is an alternative to exclusive use of either an expensive chemical approach or a less efficient biological approach.

A closed estuarine or marine recirculating aquaculture system (RAS) as used herein refers to an RAS of sea water and/or brackish water. As a closed system, the only addition is replacement of water lost to evaporation and/or cleaning. Such closed RASs are useful in fish farming. Exemplary fish species farmed using such systems include, but are not limited to, gilthead seabream, Cobia and sea bass.

As used herein, the term "filtration" refers to removal of waste from the water in a marine RAS. Chemical filtration refers to use of a filtering means that changes the chemical composition of the water. Undesired elements are removed from the water by chemical reaction. The efficiency of the chemical reaction is limited by the amounts of the elements involved in the chemical reaction that are present in the RAS. Biological filtration refers to use of filtering means containing a natural, living substance, such as bacteria or other microorganisms.

Nitrogenous wastes in estuarine or marine RAS useful in methods of the invention are eliminated through the action of nitrifying and denitrifying biofilter units that rely on oxygen and reduced organic compounds, respectively, for their activity. Nitrification is used to convert nitrogen to nitrate. Denitrification is used to convert nitrate to nitrogen gas under anaerobic conditions under sufficient conditions for such conversion.

Anaerobic denitrification in a closed estuarine or marine RAS results in a net release of hydroxyl anions and subsequent increase in pH, in accordance with the following equation:

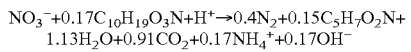

$$NO_3^- + 0.17C_{10}H_{19}O_3N + H^+ \rightarrow 0.4N_2 + 0.15C_5H_7O_2N + 1.13H_2O + 0.91CO_2 + 0.17NH_4^+ + 0.17OH^-$$

where $C_{10}H_{19}O_3N$ is used to represent estimated organic matter in wastewater based on biological oxygen demand (BOD) and only 68% of the total BOD is available for denitrification (Asano, T., et al., *Water Reuse: Issues, Technologies, and Applications*, McGraw-Hill Professional, 2007.). Approximately 3.0 to 3.6 mg of alkalinity (as $CaCO_3$) is produced per milligram of nitrate reduced to nitrogen gas.

In one embodiment the present invention relates to a method of use of a estuarine or marine recirculating aquaculture system comprising a "denitrification unit," also referred to herein as a "denitrifying bioreactor," wherein the denitrification unit reduces or removes waste nitrogen and aerobic nitrification products (e.g., nitrates) from the aquaculture system. In one embodiment the denitrification unit is a denitrifying fixed film bioreactor. In a further embodiment the denitrification unit comprises a media substrate for growth of anaerobic microorganisms active in nitrate reduction. By action of the denitrifying unit, a denitrifying biofilm is generated on the media substrate.

Media substrates useful in denitrification units in the estuarine or marine recirculating aquaculture systems useful in methods of the invention may also be referred to herein as "support media," "microbial support media" or "biomass carrier structures." The media substrates may be constructed from a variety of materials into a variety of shapes and sizes. For example, natural or artificial materials can be used, such as sponges, synthetic foams, both open-celled and close-celled foams, and extruded plastics, both specially designed extruded plastic and recycled waste plastic including polyethylene beads. Another embodiment contemplates media substrates comprised of polyurethane foam cut into cubes, spheres, or other regular and non-regular shapes, that provide a large amount of surface area for the support and growth of microorganisms. In a particular embodiment the media substrate is polyethylene bioreactor beads. In one embodiment of the invention the support media comprises a biofilter.

In wastewater treatment, biologically mediated phosphate precipitation has been observed in denitrifying biofilms as a result of localized biological increase in pH resulting in precipitation as calcium phosphates (Arvin, E., (1985) *Water Sci. Technol.* 15: 43-63; Arvin E. and Kristensen G. H., (1983) *Water Sci. Technol.* 15, 65-85), but extensive removal would require calcium concentrations greater than those associated with wastewater treatment.

However, brackish and marine closed loop RAS have high concentrations of magnesium and calcium salts inherent in both natural and/or artificial water sources. In one example, 35 ppt seawater was found to have the following composition, including high concentrations of magnesium and calcium salts:

TABLE 1

Composition of 35 ppt saltwater

| Chemical | g/l |
|---|---|
| Magnesium chloride | 6.890 |
| Calcium chloride | 1.2597 |
| Potassium chloride | 0.6552 |
| Strontium chloride | 0.0150 |

TABLE 1-continued

Composition of 35 ppt saltwater

| Chemical | g/l |
|---|---|
| Lithium chloride | 0.0011 |
| Sodium sulfate | 2.5302 |
| Magnesium sulfate | 1.8704 |
| Sodium tetraborate | 0.0399 |
| Sodium molybdate | 0.000013 |
| Sodium carbonate | 0.060 |
| Sodium bicarbonate | 0.230 |
| Sodium chloride | 21.998 |

The methods of the invention are effective in phosphate sequestration in a variety of seawater concentrations. In one embodiment the water is full strength seawater. In another embodiment water is about 50% strength seawater. In still another embodiment the water is about 25% strength seawater. In various embodiments the strength of the seawater is in a range of from about 15 ppt to about 35 ppt.

Denitrifying biofilms formed on media substrates in the denitrification unit have the ability to sequester phosphate by an increase in pH resulting from the denitrifying reaction. The present invention therefore relates to a method of sequestering phosphates in an estuarine or marine RAS utilizing both the high (basic) pH resulting from the denitrifying reaction and the calcium and magnesium salts present in the brackish or salt water.

The phosphate sequestration in the presence of calcium or magnesium results in localized precipitation on the media substrate, on or in the biofilm. Phosphate is precipitated onto or into the biofilm as poorly soluble magnesium phosphate or calcium phosphate. In the precipitated form, the phosphate may be removed from the RAS by removal of the support media, or by other means.

In one embodiment the media has a density coefficient less than water, wherein the density is less than 1 g/mL. In such embodiment, media with precipitated phosphate on or in the biofilm will sink and can be selectively removed from unsaturated non-sinking media and replaced with fresh media. In another embodiment the media is a removable biofilter, which may be removed from the system and replaced with another biofilter.

Alternatively to replacement of the removed media, the removed media may be treated and returned to the RAS for reuse. Phosphate can be removed from the media by solubilization with dilute volatile mineral (e.g., HCl) or organic (acetic) acids, and the media reused in the bioreactor. The phosphates are removed by periodic washing of the medium with dilute mineral acid. The treated media may be further reused or recycled.

Similarly, the removed phosphates may be recovered and reused or recycled. The recovered soluble phosphate salts can be recycled as a value added product in prepared artificial seawater, for production of fish food or as fertilizer. The phosphate can be recycled in prepared artificial seawater, for production of fish food or as fertilizer. In one embodiment of the invention the phosphate sequestered is an apatite. In a further embodiment the apatite is selected from fluorapatite, chlorapatite, bromapatite, and hydroxyapatite.

Recovery and recycling of the phosphate also minimizes the environmental impact of the RAS by preventing the release of phosphates into a waste stream and the local environments.

The method described herein has not been used for wastewater treatment largely because of the low calcium concentrations and the requirement for a fixed film reactor for localized precipitation and removal of precipitates. However, the estuarine or marine RAS has an inherently high concentration of calcium and employs a fixed bed bioreactor in the denitrification process—both requisite components for successful implementation of biological/chemical phosphate precipitation and recovery.

The present invention therefore provides the use of a denitrifying unit containing a media substrate for dual use in both: 1) anaerobic nitrate, nitrite and ammonia removal and 2) sequestering of excess phosphate in a brackish or marine RAS. Overall, this process minimizes or prevents phosphates from accumulating in a closed recirculating system to toxic levels and provides an alternative to release of phosphates into the environment as a waste product.

The advantages and features of the invention are further illustrated with reference to the following example, which is not to be construed as in any way limiting the scope of the invention, but rather as illustrative of one embodiment of the invention in a specific application thereof.

EXAMPLE 1

Figure 2:
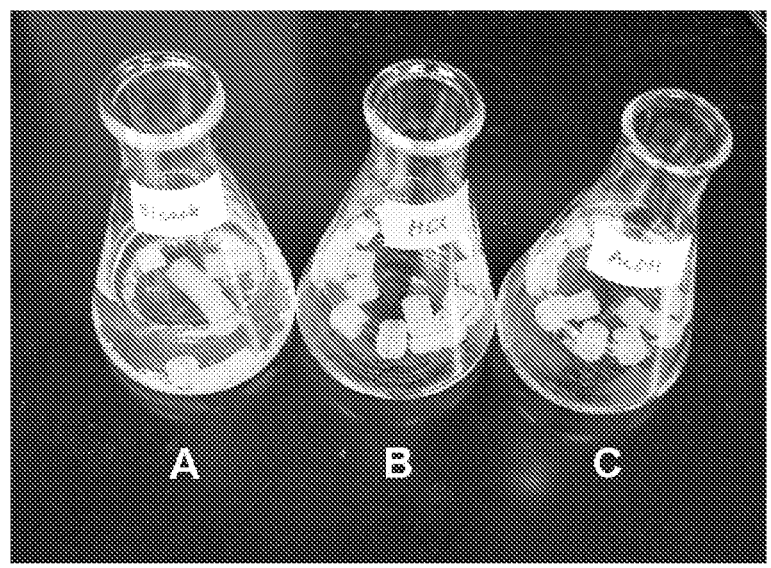
FIG. 2 is a photograph of beakers containing the results of treatment of a biofilm from a fixed film denitrification bioreactor, with (A) bleach, (B) dilute HCl or (C) acetic acid, as described in Example 1.
Figure 3:
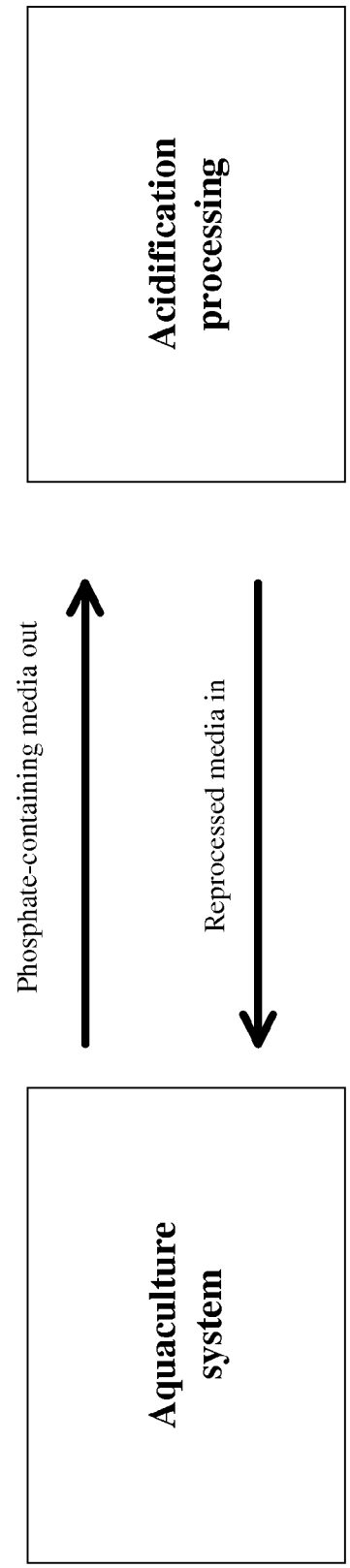
FIG. 3 is a schematic illustration of a RAS of the invention.

Biological-Chemical Sequestering of Phosphates in an Estuarine/Marine RAS Denitrification Bioreactor An anaerobic denitrification fixed film bioreactor supporting removal of waste nitrogen and aerobic nitrification products from a 24 cubic meter tank system was monitored during grow-out of gilthead seabream over a time course of 153 days (Tal, Y., et al. (2009) Aquaculture 286: 28-35.). During the growth phase, phosphate increased from undetectable levels to approximately 40 ppm after 80 days, then leveled off for the remaining growth period (FIG. 1). Examination of microbial support media in an anaerobic denitrifying bioreactor over the course of 24 months indicated that approximately 70% of the media had become coated with calcium phosphate and sunk to the bottom of the bioreactor. When media coated with crystals was treated with bleach to remove the microbial biofilms only a white precipitate remained. Treatment of the microbial biofilms on media with either dilute mineral acid (HCL) or organic acid ($CH_3COOH$) resulted in complete dissolution of both the biofilm and the precipitate (FIG. 2). Once the precipitate was removed the media again floated in water (FIG. 2B, 2C). The results are consistent with the precipitation of calcium phosphates on or in the biofilms as a result of localized alkalinity generated by the denitrification process and high concentrations of calcium inherent in estuarine and marine water.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A method for at least partially reducing phosphate products in a closed estuarine or marine recirculating aquaculture system comprising brackish or salt water, the method comprising:

denitrifying the brackish or salt water of the aquaculture system, in the presence of a dual use media substrate that is effective to support a biofilm for said denitrifying and for sequestering phosphate, under conditions sufficient to form a denitrifying biofilm on the media substrate and sufficient to form phosphate salts on or in the denitrifying biofilm, wherein the conditions sufficient to form phosphate salts on or in the denitrifying biofilm comprise a basic pH; and removing the media substrate bearing the biofilm and phosphate salts from the aquaculture system.

2. The method of claim 1, wherein the denitrifying is performed in a denitrification unit.

3. The method of claim 1, wherein the conditions sufficient to form phosphate salts comprise the presence of excess phosphate in the brackish or salt water of the aquaculture system.

4. The method of claim 1, wherein the media substrate comprises anaerobic microorganisms active in nitrate reduction.

5. The method of claim 1, wherein the media substrate comprises a solid substrate.

6. The method of claim 1, wherein the media substrate comprises a biofilter.

7. The method of claim 1, wherein the media substrate has a density coefficient less than water.

8. The method of claim 1, wherein the phosphate salts comprise calcium phosphate or magnesium phosphate.

9. The method of claim 1, further comprising removal of the phosphate salts from the media substrate.

10. The method of claim 9, wherein the removal of the phosphate salts comprises solubilization with a dilute volatile mineral acid or an organic acid.

11. The method of claim 10, wherein the dilute volatile mineral acid is HCl.

12. The method of claim 10, wherein the organic acid is acetic acid.

13. The method of claim 9, further comprising returning the media substrate to the aquaculture system.

14. The method of claim 1, wherein the aquaculture system is adapted for farming fish.

15. The method of claim 14, wherein the fish is selected from gilthead seabream, Cobia and sea bass.

16. The method of claim 1, wherein the media substrate comprises polyethylene bioreactor beads.

17. A closed estuarine or marine recirculating aquaculture system comprising:
brackish or salt water comprising nitrate products and phosphate products;
a rearing tank comprising an aquatic species; and
a denitrification unit comprising a dual use media substrate that is effective to support a biofilm for denitrification and for sequestering phosphate, wherein the denitrification unit is effective to denitrify the brackish salt water and effective to form a denitrifying biofilm on the media substrate and effective to form phosphate salts on or in the denitrifying biofilm when the pH effective to form phosphate salts on or in the denitrifying biofilm comprises a basic pH.

18. A method of anaerobic treatment of waste material of an aquacultured species in a closed estuarine or marine recirculating aquaculture system comprising brackish or salt water, the method comprising:
denitrifying the brackish or salt water of the aquaculture system, in the presence of a dual use media substrate that is effective to support a biofilm for said denitrifying and for sequestering phosphate, under conditions sufficient to form a denitrifying biofilm on the media substrate and sufficient to form phosphate salts on or in the denitrifying biofilm to thereby sequester phosphate, wherein the conditions sufficient to form phosphate salts on or in the denitrifying biofilm comprise a basic pH;
removing the media substrate from the aquaculture system; and
removing waste material from the aquaculture system and anaerobically digesting the same to produce methane gas.

19. The method of claim 18, further comprising removal of methane from the waste material.

20. The method of claim 19, wherein the removal comprises burning the methane.

* * * * *

UNITED STATES PATENT AND TRADEMARK OFFICE
CERTIFICATE OF CORRECTION

| | | |
|---|---|---|
| PATENT NO. | : 8,997,694 B2 | Page 1 of 1 |
| APPLICATION NO. | : 13/381976 | |
| DATED | : April 7, 2015 | |
| INVENTOR(S) | : Kevin R. Sowers et al. | |

It is certified that error appears in the above-identified patent and that said Letters Patent is hereby corrected as shown below:

In the Claims

Column 7, line 31: "HC1" should be -- HCl --.

Signed and Sealed this
Second Day of June, 2015

Michelle K. Lee
*Director of the United States Patent and Trademark Office*